(12) United States Patent
Hatanaka et al.

(10) Patent No.: US 6,932,474 B2
(45) Date of Patent: Aug. 23, 2005

(54) PROGRESSIVE-POWER LENS

(75) Inventors: Takashi Hatanaka, Tokyo (JP); Masaaki Matsushima, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/743,718

(22) Filed: Dec. 24, 2003

(65) Prior Publication Data

US 2004/0165145 A1 Aug. 26, 2004

(30) Foreign Application Priority Data

Jan. 9, 2003 (JP) ........................................ 2003-003422

(51) Int. Cl.[7] ................................................ G02C 7/06
(52) U.S. Cl. ...................................... 351/169; 356/124
(58) Field of Search ................................ 351/169, 161, 351/164, 168, 171, 177; 356/124, 124.5, 125–127; 33/28

(56) References Cited

U.S. PATENT DOCUMENTS

| | | | | |
|---|---|---|---|---|
| 4,441,795 A | * | 4/1984 | Lobdell | ...................... 351/169 |
| 5,960,550 A | | 10/1999 | Weir et al. | ...................... 33/28 |
| 6,088,089 A | | 7/2000 | Reis | ........................... 356/124 |
| 6,655,802 B2 | * | 12/2003 | Zimmermann et al. | ..... 351/169 |
| 2004/0233385 A1 | * | 11/2004 | Kitani et al. | ................ 351/168 |

FOREIGN PATENT DOCUMENTS

| | | |
|---|---|---|
| EP | 1 225 441 A2 | 7/2002 |
| JP | A 11-337887 | 12/1999 |
| JP | A 2000-28891 | 1/2000 |
| JP | A 2000-284234 | 10/2000 |
| WO | WO 98/28653 | 7/1998 |

* cited by examiner

Primary Examiner—Jordan M. Schwartz
(74) Attorney, Agent, or Firm—Oliff & Berridge, PLC

(57) ABSTRACT

A progressive-power lens can be properly evaluated based on optical performance values of which definition methods are not unified, such as progressive zone length and addition diopter. In addition to commodity product specifying information $11a$ which specifies a trade name of a lens 9, progressive zone length specifying information $11b$ which specifies length of a progressive zone of the lens, material refractive index specifying information $11c$ which specifies a material refractive index of the lens, and addition diopter specifying information $11d$ which specifies addition diopter of the lens, definition method specifying information $11e$ is inscribed on the progressive-power lens 9. The definition methods of the aforesaid progressive zone length and the addition diopter are specified by the definition method specifying information $11e$.

11 Claims, 4 Drawing Sheets

PROGRESSIVE-POWER LENS

BACKGROUND OF THE INVENTION

1. Field of the Invention

The present invention relates to a progressive-power lens to which optical performance specifying information specifying optical performance values such as progressive zone length and an inner shift amount for near vision is attached.

2. Description of the Related Art

Conventionally, an alignment reference mark which is a reference for positioning when the lens is set into a frame, and mark, with which progressive zone length, an inner shift amount for near vision, addition diopter and the like of the lens are identified, are inscribed on the progressive-power lens. Further, more detailed design information is inscribed on lens surfaces (refer to Patent Document 1 and the like).

These marks are inscribed at such positions as they remain within the frame even after the lens is set into the frame. Accordingly, even when the lens is set into the frame and used by a consumer, the consumer can identify the progressive zone length, the inner shift amount for near vision and the like by reading the marks (refer to Patent Document 2 and the like).

As for a method to inscribe the marks as described above on lenses, there are a method of marking with a diamond pen, a method of making an inscription by emitting laser light, and the like (refer to Patent Document 3 and the like).

[Patent Document 1]

Japanese Patent Laid-open No. 11-337887 (pages 1 to 3, FIG. 1)

[Patent Document 2]

Japanese Patent Laid-open No. 2000-284234 (pages 1 to 5, FIG. 1)

[Patent Document 3]

Japanese Patent Laid-open No. 2000-28891 (pages 1 to 7, FIG. 2)

Incidentally, the aforementioned progressive zone length, inner shift amount for near vision and addition diopter are considered to be especially important items in the evaluation of progressive-power lenses.

First, the progressive zone length means the length of the progressive zone which is an intermediate portion between a distance portion and a near portion of the progressive-power lens, and in which the refractive power successively changes. Accordingly, the progressive zone length is an important optical performance value to evaluate how much is it necessary to turn a sight line downward on the occasion of near vision, or how much is it necessary to turn a sight line upward on the occasion of distance vision, when the progress-power lens is used.

The inner shift amount for near vision means the amount by which a near center is slightly shifted to a nose side with respect to a distance center with a convergence amount of an eye being included. This also becomes a large factor to determine the optical performance of the progressive-power lens as the above-described progressive zone length. The convergence means an action of an eyeball to draw near to a nose side when a man looks at a thing near him or her.

The addition diopter means a difference between far vision refractive power and near vision refractive power of the progressive-power lens. The addition diopter is made one item of the prescription values and is an important optical performance value which significantly influences the performance of near vision of the progressive-power lens such as the width of the near range and bow close an object can be seen. Further, considering that as this addition diopter becomes larger, "jitter" and "distortion" at a side portion of a near portion which are disadvantages of the progressive-power lens tend to increase, it is necessary to make the addition diopter a proper value without excess and deficiency. From this point of view, the addition diopter can be also said to be an important optical performance value to the progress-power lens.

As described above, the progressive-power lens has the important optical performance values which are the progressive zone length, the inner shift amount for near vision, and the addition diopter. However, though the marks with which these optical performance values are identified are inscribed on the conventional progressive power lens, the lens cannot be sometimes suitably evaluated based on them by simply looking at the mark. This is because the methods of defining these optical performance values are not always unified and there exist a plurality of defining methods.

Explaining in concrete, concerning the progressive zone length, for example, the conventional progressive-power lens has the following problems.

First, in such a type of progressive-power lens as has a progressive surface only on one of a convex surface or a concave surface, it is normal to define the progressive zone length with a surface having the progressive surface as a reference. However, when the lens is designed and manufactured after receiving an order, even lens having the progressive surface on the convex surface can be designed and manufactured by defining the progressive zone length with the concave surface as a reference. Similarly, even such a type of lens as has the progressive surface on the concave surface can be designed and manufactured by defining the progressive zone length with the convex surface as a reference.

In such a type of lens as creating the progressive refractive performance on both surfaces by combining the refractive performances on the convex surface and the concave surface, it is not that only any one of the surfaces is the progressive surface, and therefore the progressive zone length can be defined with any surface of the convex surface and the concave surface as the reference.

In this manner, the progressive zone length is defined with the convex surface as the reference in some cases, and it is defined with the concave surface as the reference in other cases. It is not always unified which surface is made the reference. However, in the case with the convex surface of the lens being made the reference, and in the case with the concave surface being made the reference, an angle of the sight line passing through a near eye point, which is the amount of how much it is necessary to turn the sight line downward on the occasion of near vision, differs, even when the values of the progressive zone length identified by the marks inscribed on the lens are the same. This problem is the problem similarly occurs to the inner shift amount for near vision.

In concrete, as shown in FIG. 6, a model which directs a sight line to a progressive-power lens 3 from a center of rotation 2 of the eye 1 is assumed. In this model, when a progressive zone length 4 is defined with a convex surface 3a as a reference, the sight lines passing through a distance eye point and a near eye point on the convex surface 3a are what are shown by the reference numerals 5 and 6, respectively. On the other hand, the progressive zone length 4 is defined with a concave surface 3b as the reference, and the sight lines passing through the distance eye point and the near eye point on the concave surface 3b are what are shown by the reference numerals 7 and 8, respectively.

Then, even the definition value of the progressive zone length 4 is the same as shown in FIG. 6, the case in which the progressive zone length is defined with the convex surface 3a as the reference and the case in which the progressive zone length is defined with the concave surface 3b as the reference are obviously different especially from the viewpoint of the angles of the sight lines 6 and 8 for the near vision. Accordingly, there is the problem that the optical performance of the progressive-power lens cannot be accurately evaluated from the concrete viewpoint of how much the sight line needs to be turned downward, for example, on the occasion of the near vision, by only specifying the definition value of the progressive zone length.

Next, concerning the addition diopter, the conventional progressive-power lens has the following problem.

In the markets of Japan and the United States, the addition diopter is normally defined as the difference between the refractive power measured by applying the opening of a lens meter to the reference point of the near portion on the convex surface and the refractive power measured by applying the opening of the lens meter to the reference point of the distance portion on the convex surface, in the progressive-power lenses of the type having the progressive surfaces on the convex surfaces.

However, in Europe, the addition diopter is sometimes defined as the difference between the refractive power measured by applying the opening of a lens meter to the reference point of the near portion on the concave surface and the refractive power measured by applying the opening of the lens meter to the reference point of the distance portion on the concave surface, also for the progressive-power lenses of the type having the progressive surfaces on the convex surfaces.

On the other hand, in the progressive-power lenses of the type having the progressive surfaces on the concave surfaces, the addition diopter is normally defined as the difference between the refractive power measured by applying the opening of a lens meter to the reference point of the near portion on the concave surface and the refractive power measured by applying the opening of the lens meter to the reference point of the distance portion on the concave surface.

In the progressive-power lenses of the type having the progressive surfaces on the concave surfaces, there is the one which is corrected in consideration of a worn state at the time of design. In this case, the difference between the refractive power measured by applying a lens meter to the reference point of the near portion on the concave surface and the refractive power measured by applying the lens meter to the reference point of the distance portion on the concave surface differs from the ordered addition diopter by the amount of correction in consideration of the worn state.

In a lens of the type which make the progressive refraction performance on both surfaces by combining the refraction performances of the convex surface and the concave surface, it is not that only any one surface is the progressive surface, and therefore the addition diopter can be defined with any surface of the convex surface and the concave surface.

Further, there is the method of determining the addition diopter by selecting the optical value of the spectacle lens so that a light wave surface coming into the eyes of a testee at the time of optometry, and a light wave surface coming into the eyes of the testee when the testee wearing the spectacle lens sees an object correspond to each other or an closely analogous to each other, based on the information by what optometry method the addition diopter is determined.

As described above, there are various definition methods of the addition diopter. Accordingly, by only specifying the value of the addition refractive power, it is not always clear by which method the value is defined, and therefore there is the problem that the evaluation reference for the lens differs.

SUMMARY OF THE INVENTION

An object of the present invention is to provide a progressive-power lens which makes it possible to evaluate the lens properly based on optical performance values of the progressive-power lens by indicating progressive zone length, an inner shift amount for near vision, an addition refractive power and a plurality of their definitions, as a solution to the above-described problems.

According to a first mode of the present invention, in a progressive-power lens, the progressive power lens characterized in that optical performance specifying information which specifies optical performance values of the progressive-power lens, and definition method specifying information which specifies definition methods of the optical performance values are attached is provided. According to this progressive-power lens, the definition methods of the optical performance values can be specified by the definition method specifying information, and therefore even if the definition methods of the optical performance values are not unified, the lens can be properly evaluated based on the optical performance values.

According to a second mode of the present invention, in the first mode, the progressive-power lens characterized in that as the aforesaid definition method specifying information, reference surface specifying information that specifies which one of a convex surface and a concave surface is used as a reference when the optical performance value is defined is attached is provided.

According to the concrete mode of the present invention, in the second mode, the progressive-power lens characterized in that as the aforesaid evaluation value specifying information, at least any one of the progressive zone length specifying information which specifies the progressive zone length of the progressive-power lens, and the inner shift amount for near vision specifying information, which specifies the inner shift amount for near vision, is attached is provided.

According to a third mode of the present invention, in the first or the second mode, the progressive-power lens characterized in that as the aforesaid optical performance specifying information, addition diopter specifying information which specifies a value of addition diopter of the progressive-power lens is attached, and as the definition method specifying information, addition diopter definition method specifying information that specifies at least which one of a convex surface and a concave surface of this progressive-power lens is used as a reference when the addition diopter is defined, or the addition diopter is calculated based on a sight line position and a center of rotation of an eye when wearing this progressive-power lens is attached is provided.

According to a fourth mode of the present invention, in the mode in claim 1 to claim 3, the progressive-power lens characterized in that two alignment reference marks for framing are attached on a horizontal reference line passing through a design center of the progressive-power lens symmetrically about the design center, these alignment reference marks are disposed at positions at which they remain on a lens surface after the lens is set into a frame; and the optical performance specifying information and the definition method specifying information are attached in the vicinity of the alignment reference marks is provided.

In the present invention, the alignment reference marks, the optical performance specifying information and the definition method specifying information can be attached in the form of letters (including English characters, numerals and the like), diagrams, and the like.

Attaching the information to the lens can be realized in concrete by inscribing the information on a lens surface by laser, marking and the like, or printing it on the lens surface by inkjet and the like.

According to a fifth mode of the present invention, in the first to the fourth modes, the progressive-power lens characterized in that the aforesaid definition method specifying information is symbolized and attached; and meaning of the symbols can be identified with reference to code tables previously made is provided.

According to the concrete mode of the present invention, in the first to the fifth modes, the progressive-power lens characterized in that the aforesaid definition method specifying information is symbolized and attached, and the definition methods of a plurality of kinds of the aforesaid optical performance values are specified by the same aforesaid symbols is also provided.

According to the concrete mode of the present invention, in the progressive-power lens according to the first to the fifth modes, the progressive-power lens characterized in that the aforesaid definition method specifying information is attached to only either one of the concave surface or the convex surface of this progressive-power lens is also provided.

DETAILED DESCRIPTION OF THE PREFERRED EMBODIMENT(S)

Figure 1:
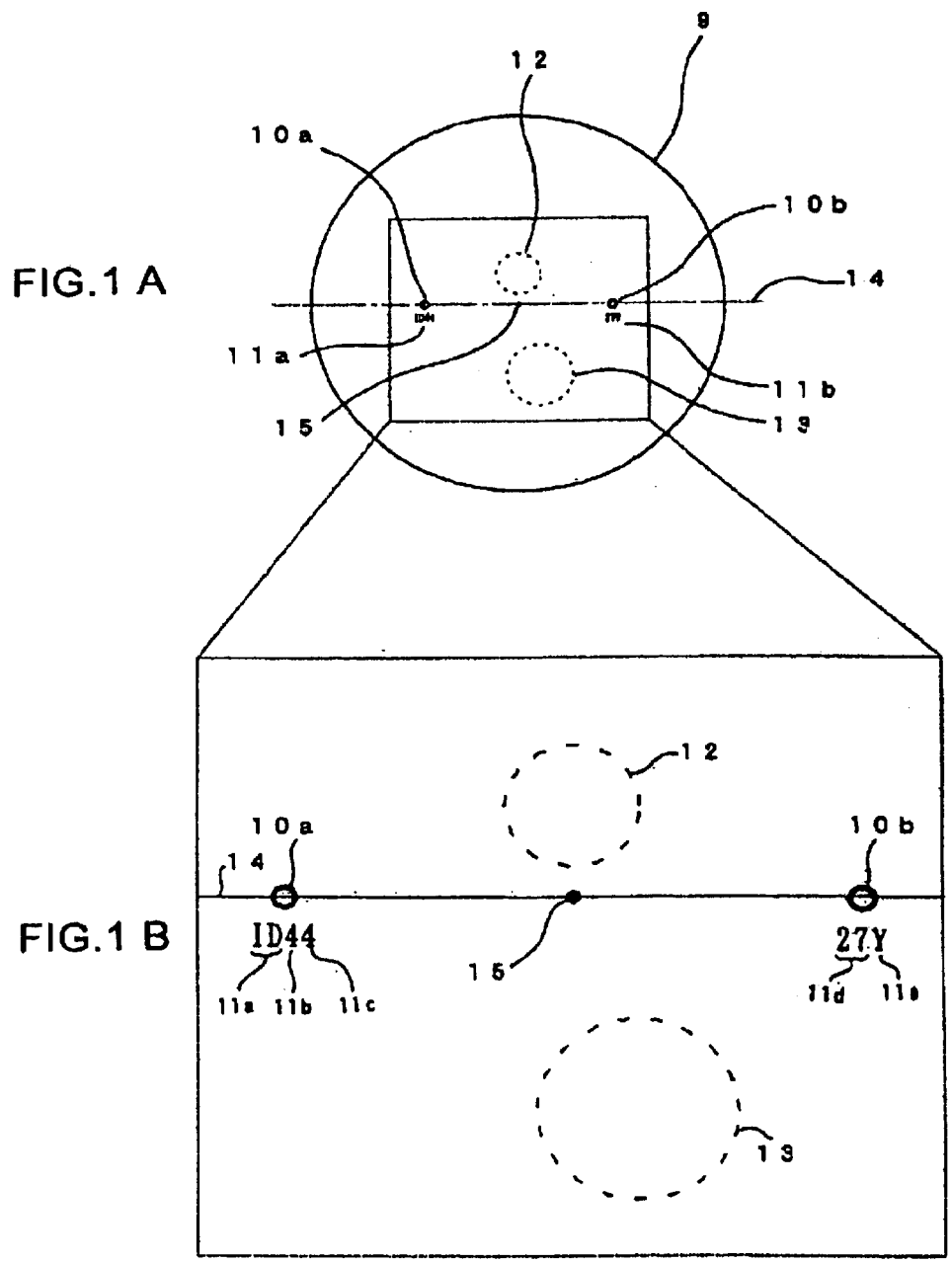
FIGS. 1A and 1B are diagrams schematically showing a progressive-power lens according to an embodiment.

FIG. 1A shows an entire progressive-power lens according to an embodiment, and FIG. 1B shows an essential part of a surface of the lens by enlarging it. In a progressive-power lens 9 in the drawings, alignment reference marks 10a and 10b which are references of alignment when the lens 9 is set into a frame, a commodity product specifying information 11a which specifies a trade name, a progressive zone length specifying information 11b which specifies length of a progressive zone of the lens, material refractive index specifying information 11c which specifies a material refractive index of the lens, addition diopter specifying information 11d which specifies addition diopter of the lens, and definition method specifying information 11e which specifies a method of defining the addition diopter, the progressive zone length and the like, are inscribed.

In FIGS. 1A and 1B, reference numeral 12 denotes a distance area (distance portion) which is used for distance vision, reference numeral 13 denotes a near area (near portion) which is used for near vision, reference numeral 14 denotes a horizontal reference line of the lens 9, and reference numeral 15 denotes a design center of the lens. However, these distance area 12, near area 13, horizontal reference line 14 and design center 15 are shown for convenience of explanation, and are not actually attached onto the lens 9.

Though schematically shown by the broken lines in FIGS. 1A and 1B, there is not a clear boarder between the distance portion 12 and the near portion 13, and there is a progressive zone where refractive power successively changes between both of them. The lens 9 shown in FIGS. 1A and 1B is a lens for a right eye with its left side for an ear side and its right side for a nose side, and it is known that the near portion 13 is inwardly sifted to the nose side with respect to the distance portion 12. A lens for a left eye has a layout which is provided by making, for example, each constituent element of the lens 9 for the right eye laterally symmetric about a vertical line (meridian) passing through the design center 15, and therefore illustration thereof is omitted.

As shown in FIGS. 1A and 1B, two alignment reference marks 10a and 10b are attached on the horizontal reference line 14 passing through the design center 15 of the lens 9 symmetrically about the design center 15. Namely, the two alignment reference marks 10a and 10b are inscribed at positions spaced equidistantly from the design center 15 on the horizontal reference line 14.

These alignment reference marks 10a and 10b are inscribed at the positions at which they remain on a surface of the lens 9 even after this lens 9 is set into a frame. In concrete, each distance from the design center 15 of the lens to the alignment reference marks 10a and 10b is, for example, 17 [mm].

The commodity product specifying information 11a, the progressive zone length specifying information 11b, the material refractive index specifying information 11c, the addition diopter specifying information 11d and the definition method specifying information 11e are inscribed in the vicinity of the alignment reference marks 10a and 10b. More specifically, the commodity product specifying information 11a, the progressive zone length specifying information 11b and the material refractive index specifying information 11c are inscribed in a lower portion in close vicinity of the alignment reference mark 10a at the ear side, and the addition diopter specifying information 11d and the definition method specifying information 11e are inscribed in a lower portion in close vicinity of the alignment reference mark 10b at the nose side.

Accordingly, what is shown in FIGS. 1A and 1B is a so-called round lens in an unworked state, and even after this is worked in a shape of a spectacle frame, all the information 11a, 11b, 11c, 11d and 11e remains on a lens surface with the alignment reference marks 10a and 10b.

However, the alignment reference marks 10a and 10b and the information 11a, 11b, 11c, 11d and 11e are all inscribed on a use portion of this progressive-power lens 9, and therefore they are made so-called hidden marks so as to be invisible as much as possible. The hidden marks can not be usually recognized by naked eyes, and can be confirmed only after a special light source (example: fluorescent light) is shone thereon or they are viewed from a specific angle, and therefore they do not become obstacles in the visual field.

The commodity product specifying information 11a is attached by being symbolized. The symbols are constituted of English characters. In the example shown in FIGS. 1A and 1B, "ID" is given as the symbol. The meaning of this symbol "ID" can be identified by a commodity product code table previously made. Namely, as shown in the following Table 1, each symbol is assigned with a trade name corresponding to the symbol in the commodity product code table. Accordingly, with reference to this commodity product code table, the trade name corresponding to the item of the code "ID" is identified as "HOYALUX ID".

TABLE 1

| CODE | TRADE NAME |
|------|------------|
| ID   | HOYALUX ID |

Next, the progressive zone length specifying information 11b is also attached by being symbolized. The symbols are constituted of numerals or English characters. In the example shown in FIGS. 1A and 1B, "4" is attached as the symbol. The meaning of this symbol "4" can be identified by a progressive zone length code table previously made. Namely, as shown in the following Table 2, each symbol is assigned with a value of the progressive zone length corresponding to the symbol, in the progressive zone length code table. Accordingly, with reference to this progressive zone length code table, the progressive zone length corresponding to "4" of the item of the code is identified as "14 mm". In Table 2, the unit of the progressive zone length is millimeter.

TABLE 2

| CODE | PROGRESSIVE ZONE LENGTH |
|------|-------------------------|
| 0    | 10 |
| 1    | 11 |
| 2    | 12 |
| 3    | 13 |
| 4    | 14 |
| 5    | 15 |
| 6    | 16 |
| 7    | 17 |
| 8    | 18 |
| 9    | 19 |
| A    | 20 |
| B    | 21 |
| C    | 22 |
| D    | 23 |
| E    | 24 |
| F    | 25 |

Here in Table 2, the method of assigning the symbol to the progressive zone length has characteristics. Normally, the value of the progressive zone length is within about 10 mm to 25 mm as shown in Table 2. Consequently, in the range of the progressive zone length of 10 mm to 19 mm, a numeral of a lower-order digit of the value is used as a symbol indicating the value of the progressive zone length. In the range of the progressive zone length of 20 mm or longer, English characters A, B, C . . . are assigned to 20 mm, 21 mm, 22 mm . . . , respectively as the symbols.

In this manner, the progressive zone length and the symbol can be made understandably corresponding to each other by using one symbol constituted of a numeral or an English character, irrespective of the fact that the values of the progressive zone lengths are actually of two digit. It can be easily confirmed that if the assigned symbol is a numeral, it is the progressive zone length in the range of 10 mm to 19 mm with its numeral value being the value of the lower-order digit and if it is an English character, it is the progressive zone length of 20 mm or longer, without always referring to the progressive zone length code table (refer to Table 2).

Next, the material refractive index specifying information 11c is also attached by being symbolized. The symbols are constituted of numerals. In the example shown in FIGS. 1A and 1B, "4" is attached as the symbol. The meaning of the symbol "4" can be identified in accordance with the material refractive index code table previously made. Namely, as shown in the following Table 3, each symbol is assigned with the value of the refractive index of the lens material corresponding to the symbol. Accordingly, with use of this material refractive index code table, the material refractive index corresponding to "4" of the item of the code is identified as "1.7"

TABLE 3

| CODE | MATERIAL REFRACTIVE INDEX |
|------|---------------------------|
| 3    | 1.6 |
| 4    | 1.7 |

Next, the addition diopter specifying information 11d is also attached by being symbolized. The symbols are constituted of two-digit numbers. In the example shown in FIGS. 1A and 1B, "27" is attached as the symbol. The meaning of this symbol "27" can be identified in accordance with an addition diopter code table previously made. Namely, as shown in the following Table 4, each symbol is assigned with a value of the addition diopter corresponding to the symbol, in the addition dioptor code table. Accordingly, with use of this addition diopter code table, the addition diopter corresponding to "27" of the item of the code can be identified as "2.75 D". In Table 4, the unit of the addition diopter is diopter [D].

TABLE 4

| CODE | ADDITION DIOPTER |
|------|------------------|
| 05   | 0.50 |
| 07   | 0.75 |
| 10   | 1.00 |
| 12   | 1.25 |
| 15   | 1.50 |
| 17   | 1.75 |
| 20   | 2.00 |
| 22   | 2.25 |
| 25   | 2.50 |
| 27   | 2.78 |
| 30   | 3.00 |
| 32   | 3.25 |
| 35   | 3.50 |
| 37   | 3.75 |
| 40   | 4.00 |

Here, in Table 4, a method of assigning the symbols to the addition diopters (addition refractive power) has characteristics. Normally, the addition diopter in the range of about 0.50 D to 4.00 D at pitches of 0.25 D is used as shown in Table 4. Consequently, in the present invention, digit sequences combining the numerals of one place and numerals of one decimal place in the addition diopters in this order are adopted as the symbols which are assigned to the addition diopters.

In concrete, as the symbol corresponding to the addition diopter 2.75 D, "27", which is the digit sequence combining "2" that is the numeral of one place of the "2.75" and "7" that is the numeral of one decimal place in this order, is adopted. As the symbol corresponding to the addition diopter 0.75 D, "07", which is the digit sequence combining "0" that is the numeral of one place of 0.75 and "7" that is the numeral of one decimal place in this order, is adopted.

In doing so, it is easy to analogize the addition diopters from the symbols on the other hand. For example, when the symbol is "32", the addition diopter of 3.25 D can be specified, as "3" is made the numeral of one place and "2" is made the numeral of one decimal place in this digit sequence. Though "5" that is the numeral of two decimal place of the addition diopter cannot be specified from only the symbol "32", it can be known because the addition diopters are regularly set at the pitches of 0.25, and considering its regularity, the addition diopter with "3" as the numeral of one place and "2" as the numeral of one decimal place is only 3.25 D.

More specifically, as shown in Table 4, there is the regularity that when the lower-order digit of the symbol is "0" or "5", the numeral of two decimal place of the addition diopter is "0", and when the lower-order digit of the symbol is "2" or "7", the numeral of two decimal place of the addition diopter is "5". Accordingly, considering this regularity, it is possible to identify the values of the addition diopters from the symbols easily without always referring to the addition diopter code table.

As described above, in accordance with the assigning method of the symbols to the addition adopters according to the present invention, the information actually including three numerals such as "3.75" can be shortened to the two-digit sequence as "37", and the addition diopters corresponding to the symbols can be easily obtained from the symbols without always referring to the addition diopter code table.

Next, the definition method specifying information 11e is also attached by being symbolized. The symbols are each constituted by one English character. In the example shown in FIGS. 1A and 1B, "Y" is attached as the symbol. The meaning of this symbol "Y" can be identified in accordance with the definition code table previously made. Namely, as shown in the following Table 5, each symbol is assigned with the method of definition of the addition diopter, progressive zone length and the like corresponding to the symbol, in the definition code table. Accordingly, with reference to this definition code table, it can be identified that the addition diopter fled by the addition diopter specifying information 11d is defined in accordance with "wear addition diopter", and the progressive zone length identified by the progressive zone length specifying information 11b is defined on the side of the concave surface, namely, defined with the concave surface as the reference, based on the symbol "Y".

Namely, in this embodiment, the definition method specifying information 11e has both the role as addition diopter definition method specifying information which specifies whether the addition diopter of the lens 9 is defined in accordance with the convex surface addition diopter, or the concave surface addition diopter, or the wearing addition diopter, and the role as reference surface specifying information which specifies whether the progressive zone length and the inner shift amount for the near vision are defined with the convex surface or the concave surface of this lens 9 as the reference. These plurality of roles are respectively carried by each single English character.

In this embodiment, inscription of the inner shift amount for near vision specifying information which specifies the inner shift amount for near vision is omitted, but when this inner shift amount for near vision specifying information is inscribed, the surface which becomes the reference of the definition corresponds to the surface which becomes the reference of the definition of the progressive zone length (refer to Table 5).

TABLE 5

| CODE | ADDITION DIOPTER MEASURING METHOD | PROGRESSIVE ZONE LENGTH (AND INNER SHIFT AMOUNT FOR NEAR VISION) DEFINITION METHOD |
|---|---|---|
| G | CONVEX SURFACE ADDITION DIOPTER | DEFINED ON CONVEX SURFACE SIDE |
| H | | DEFINED ON CONCAVE SURFACE SIDE |
| C | CONCAVE SURFACE ADDITION DIOPTER | DEFINED ON CONVEX SURFACE SIDE |
| D | | DEFINED ON CONCAVE SURFACE SIDE |
| X | WEAR ADDITION DIOPTER | DEFINED ON CONVEX SURFACE SIDE |
| Y | | DEFINED ON CONCAVE SURFACE SIDE |

Here, "the convex surface addition diopter", "the concave surface addition diopter" and "the wear addition diopter" being the definition methods of the addition diopter (measuring methods of the addition diopter) will be explained.

"The convex surface addition dioper" is the information specifying that the addition diopter value specified by the above-described addition diopter specifying information 11d is defined with the convex surface of this lens 9 as the reference. Namely, the convex surface addition diopter means a difference between refractive power at the near point and the refractive power at the distance point on the convex surface of the progressive-power lens 9.

Figure 2:
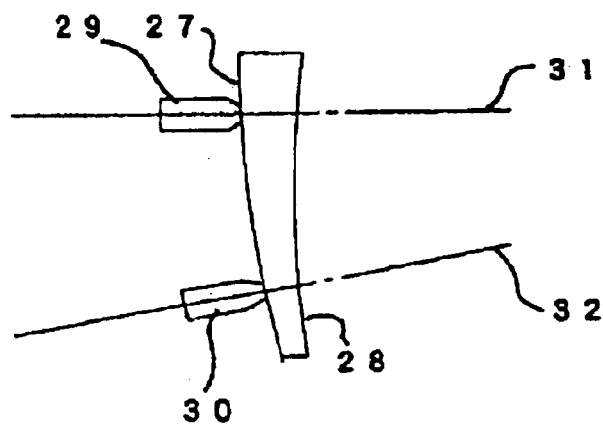
FIG. 2 is a view to explain a measuring method of a convex surface addition diopter.

The measurement of this convex surface addition diopter is in accordance with the following method. As shown in FIG. 2, measurement by a lens meter is performed in the state in which an opening 29 of the lens meter is applied to a measurement position at a distance point on a convex surface 27 of a progressive-power lens 28, and an opening 30 of the lens meter is applied to a measurement position at a near point. Then, refractive power in a direction of a distance portion transmitted light beam 31 at the measurement position at the distance point, and refractive power in a direction of the near portion transmitted light beam 32 at the measurement position at the near point are obtained, and a difference between both of them is made the convex surface addition diopter.

Next, "the concave surface addition diopter" is the information which specifies that the addition diopter value specified by the above-described addition diopter specifying information 11d is defined with the concave surface of this lens 9 as the reference. Namely, the concave surface addition diopter means a difference between refractive power at the near point and refractive power at the distance point on the concave surface of the progressive-power lens 9.

Figure 3:
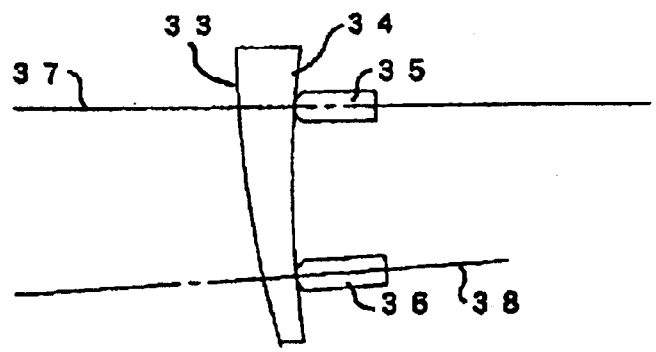
FIG. 3 is a view to explain a measuring method of a concave surface addition diopter.

Measurement of this concave surface addition diopter is in accordance with the following method. First, as shown in FIG. 3, measurement by a lens meter is performed in the state in which an opening 35 of the lens meter is applied to a measurement position at a distance point on a concave surface 34 of a progressive-power lens 33, and an opening 36 of the lens meter is applied to a measurement position at a near point. Refractive power in a direction of a distance portion transmitted light beam 37 at the measurement position at the distance point, and refractive power in a direction of a near portion transmitted light beam 38 at the measurement position at the near point are obtained, and a difference of both of them is determined as the concave surface addition diopter.

Figure 4:
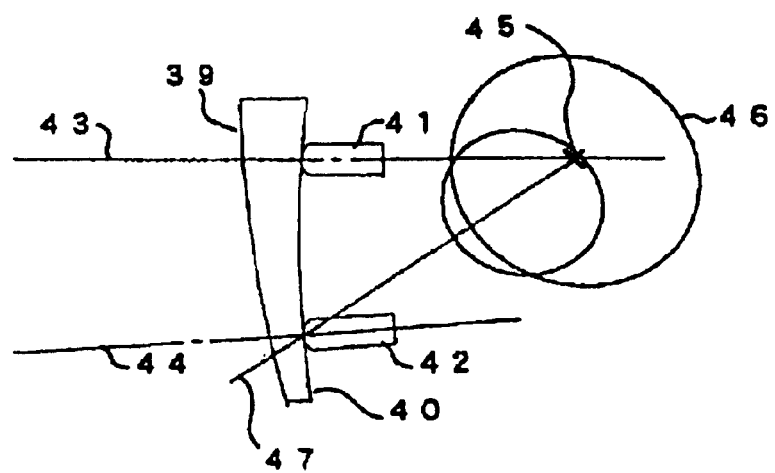
FIG. 4 is a view to explain a measuring method of a wear addition diopter.

Next, "the wear addition diopter" is the information which specifies that the addition diopter specified by the above-described addition diopter specifying information 11d is calculated based on the sight line position and the center of rotation of the eye when wearing this lens 9. Namely, as shown in FIG. 4, when the progressive-power lens is designed so that a light beam entering an eyeball 46 wearing the lens is at predetermined addition diopter, in consideration of the center of rotation 45 of the eye 46, the addition diopter is called the wear addition diopter.

Measurement of this addition diopter is basically the same as the measurement of the above-described concave surface addition diopter, but the near refractive power is measured with a lens meter opening 42 at the time of measuring the near portion being perpendicularly placed at a concave surface 40, and therefore the near refractive power in a rotating direction 47 of the eye 46 cannot be measured. Accordingly, the wear addition diopter cannot be measured with the totally same method as the concave surface addition diopter, and therefore addition diopter for check which is separately calculated from the design of the progressive-power lens and the center of rotation 45 of the eye 45 is used as the near refractive power, in the measurement of the wear addition diopter.

Each of the information 11a to 11e is explained thus far, and there is the characteristics in the placing order of the information 11a to 11e. Namely, a character string as a whole which a group of symbols constituted of the information 11a to 11e represent is such that numerals and English characters are alternately arranged. A group of symbols are inscribed by being divided for the position in the vicinity of the alignment reference mark 10a at the ear side and at the position in the vicinity of the alignment reference mark 10b at the nose side, and therefore a division between them is made clear. This makes the division in the group of symbols clear, and therefore it is easy to distinguish the individual information 11a to 11e.

In concrete, in this embodiment, the information 11a, 11b and 11c which is inscribed at a lower portion in the vicinity of the alignment reference mark 10a at the ear side constitutes a character string "ID44" as a whole. Since this character string is made by combining an English character string "ID" and a digit sequence "44", it is clear that there is the division between both of them, and it can be easily recognized that a plurality of pieces of information are contained in "ID44". As a result, a person skilled in the art especially can understand quickly that "ID" indicates the commodity product specifying information 11a, "4" in ten place of "44" indicates the progressive zone length specifying information 11b, and "4" in one place indicates the material refractive index specifying information 11c. As modified examples of this character string, "4ID4", "44ID" and the like can be considered.

As for the information 11d and 11e inscribed at a lower portion in the vicinity of the alignment reference mark 10b at the nose side, this character string constituting the character string "27Y" as a whole is formed by combining the digit sequence "27" and the English character "Y", and therefore it is clear that there is a division between both of them, which makes it possible to easily recognize a plurality of pieces of information are contained in "27Y". As a result, a person skilled in the art especially can understand quickly that "27" indicates the addition diopter specifying information 11d and "Y" indicates the definition method specifying information 11e. As a modified example of this character string, "Y27" and the like can be considered.

As a comparison example, a case in which all the above-described information 11a to 11e is expressed in numerals is assumed. In this case, if, for example, the commodity product specifying information is assumed to be "99" and the definition method specifying information is assumed to be "7", the inscribed contents are "9944" and "277". However, with this inscribed contents, the divisions are unclear because all are numerals though the amount of information carried thereon is the same as in the case of this embodiment, and it is difficult to estimate the meaning.

Even in the case using English characters and numerals as in this embodiment, if a group of characters are arranged, for example, as "IDW" and "4427", the divisions of the groups of characters are unclear, and therefore it is difficult to discriminate the individual information.

Figure 5:
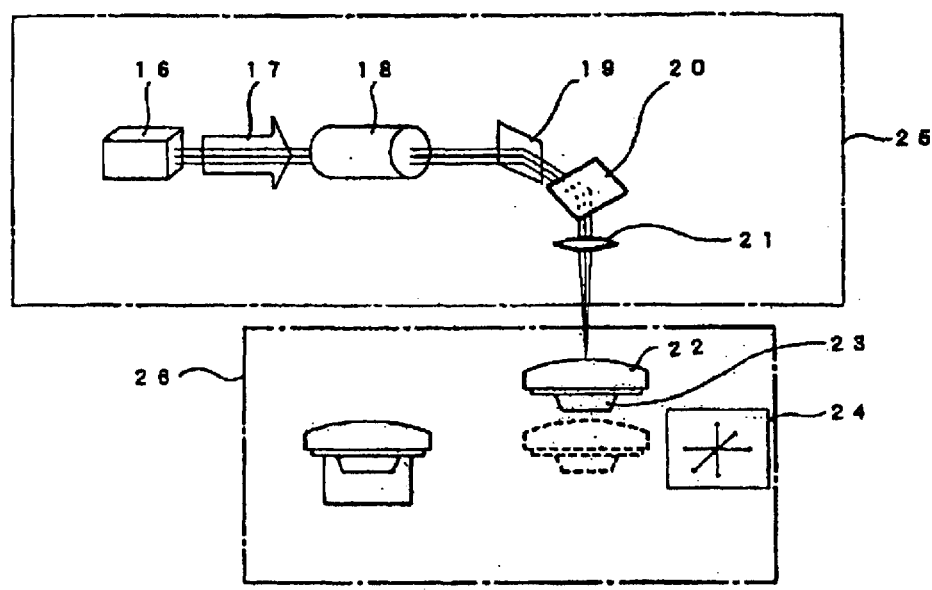
FIG. 5 is a view showing a constitution of an essential part of an inscribing device.
Figure 6:
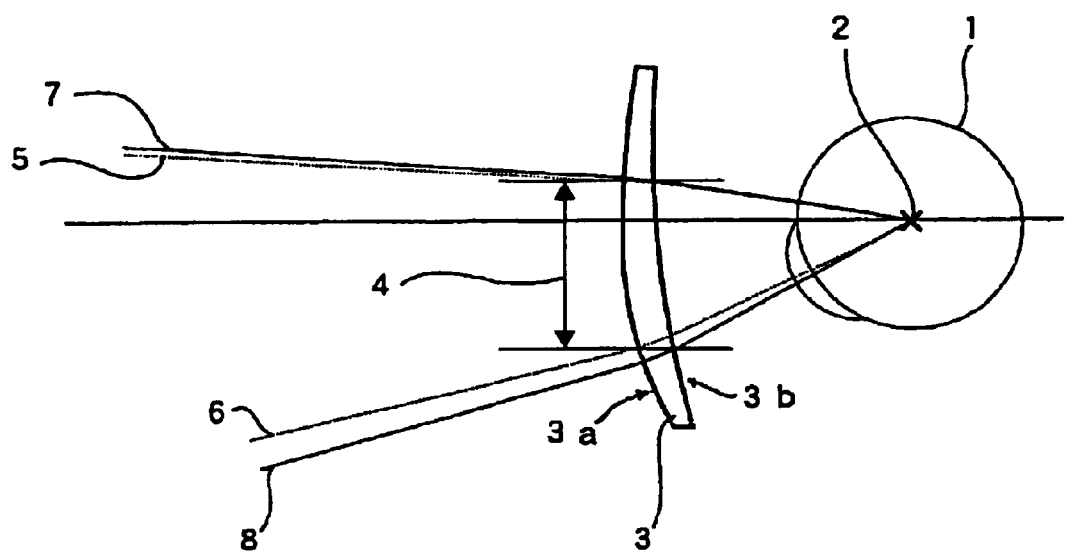
FIG. 6 is a view to explain a problem of a prior art.

Next, an inscribing method of the aforementioned alignment reference marks 10a and 10b, the commodity product specifying information 11a, the progressive zone length specifying information 11b, the material refractive index specifying information 11c, the addition diopter specifying information 11d and the definition method specifying information 11e will be explained. FIG. 5 shows a constitution of an essential part of an inscribing device. Broadly divided, this inscribing device is constituted of a laser control unit 25 and a device position control unit 26.

In the laser control unit 25, a laser oscillator 16 oscillates laser for inscription. As the laser for the inscription, $CO_2$ laser, excimer laser, YAG laser or the like can be used. In one example, the laser oscillator 16 oscillates $CO_2$ laser with the maximum oscillation output of 30 [W], the average of 12 [W], and emission peak wavelength of 10.6 [$\mu$m].

Laser light 17 which is emitted from the laser oscillator 16 is expanded in its spot by a beam expander 18, changed in its direction by a pair of reflecting plates 19 and 20, and is condensed at a predetermined inscription position on a progressive-power lens 22 with a condenser lens (example: fθ lens) 21. What the reference numeral 22 denotes may be a semi-finished product after convex surface grinding (semi-finished lens).

In the laser control unit 25, among a pair of reflecting plates 19 and 20, one is for an X direction and the other is for a Y direction. By controlling the orientation of these reflecting plates 19 and 20, the spot position of the laser can be optionally scanned on the surface of the lens 22. In this manner, the spot of the laser is traced along the characters, diagram and the like on the surface of the lens 22, whereby the symbols as the above-described each of the information 11a, 11b, 11c, 11d and 11e and the alignment reference marks 10a and 10b can be inscribed.

Meanwhile, the lens 22 which is the object of marking is held on a mounting base 23 at a side of the device position control unit 26. The mounting base 23 is movable in a three-dimensional directions of X, Y and X as shown by reference numeral 24. Accordingly, by controlling the three-dimensional position of the mounting base 23, a desired symbol or the like can be inscribed with the laser light condensed on an optional position on the surface of the lens 22.

In concrete, desired marks (example: circle) are inscribed at the alignment reference positions as the alignment reference marks 10a and 10b, and each information of the trade name, progressive zone length, material refraction index, addition diopter, and the definition methods of the addition diopter and the progressive zone length is symbolized and inscribed as the information 11a to 11e. In concrete, in accordance with the code table shown in Table 1 to Table 5, the above-described information 11a to 11e is inscribed at portions which are in the vicinity of the alignment reference marks 10a and 10b and lower from the horizontal reference line 14. In the lens 9 as shown in FIGS. 1A and 1B, the inscription contents are "ID44" and "27Y".

In one example, as a preferable condition when the alignment reference marks 10a and 10b and the above-described information 11a to 11e are inscribed, the laser power is made 70%, scanning speed is made 650 [mm/sec], and superimposing inscription repeating times are six times. In this case, after superimposing inscription is continuously performed three times, it is preferable to perform the remaining superimposing inscription of three times after a waiting time of several seconds elapses. In dosing so, the deformation of the lens surface by heating can be suppressed to the minimum.

In the one example, the shape of the inscription is such that the character height is 2.0 [mm], the character width is 2.0 [mm] and the line width is 0.12 [mm].

According to this embodiment, the following effects can be obtained.

(1) According to this progressive-power lens 9, the definition method specifying information 11e is inscribed on its lens surface, and therefore the definition methods of the progressive zone length and the addition diopter as the optical performance values of the lens 9 can be identified by the definition method specifying information 11e. Accordingly, even if the definition methods of the progressive zone length and the addition diopter are not unified, the lens 9 can be properly evaluated based on the values of the progressive zone length and the addition diopter specified by the progressive zone length specifying information 11b and the addition diopter specifying information 11d which are inscribed on the lens surface.

(2) The commodity product specifying information 11a, the progressive zone length specifying information 11b, the material refractive index specifying information 11c, the addition diopter specifying information 11d, and the definition method specifying information 11e are inscribed in the vicinity of the alignment reference marks 10a and 10b, and therefore each of the information 11a to 11e also remains on the lens surface after the lens 9 is set into the frame as the alignment reference marks 10a and 10b. Accordingly, there is the advantage that the detailed information of the lens 9 can be always discriminated based on the information 11a to 11e inscribed on the lens surface not only before frame edging but also after the lens is set into the frame. As a result, efficiency in production and management of the addition refractive-power lens can be enhanced.

(3) Since the definition method specifying information 11e is symbolized and inscribed, and the meaning of the symbols can be identified by using the definition code table (refer to Table 5) previously made, the definition methods of a plurality of kinds of optical performance values such as the progressive zone length (and the inner shift amount for near vision), the addition diopter and the like can be specified by a single symbol (example: "Y"). Consequently, though the amount of information which is given to the lens 9 increases by the amount of this definition method specifying information 11e, the actual number of inscriptions does not have to be increased.

(4) Other than the definition method specifying information 11e, as for the progressive zone length specifying information 11b and the addition diopter specifying information 11d, the symbols expressing the information with the minimum number of characters are used while such comprehensibility as to make it possible to understand them without always referring to the code table is left, and the symbol of one character is used for the material refractive index specifying information 11c, thus making it possible to reduce the actual number of inscriptions on the lens surface to the minimum.

(5) As for the content of the inscription, not only numerals but also English characters are used in combination, and the entire arrangement itself of the inscribed symbols is given information, whereby the division of each symbol becomes clear, and identification of the inscription content is facilitated.

(6) Since the commodity product specifying information 11a, the progressive zone length specifying Information 11b and the material refractive index specifying information 11c are displayed at the nose side, and the addition diopter specifying information 11d and the definition method specifying information 11e are displayed at the ear side, the information of them is identified and at the same time, it can be determined whether the progressive-power lens is the design for a left eye or a right eye. Since the number of letters of the group of the symbols (example: "ID44") inscribed at the nose side is four, and the number of letters of the group of the symbols (example: "27Y") inscribed at the ear side is three, it can be also easily determined whether the progressive-power lens is for a left eye or a right eye by utilizing this. Further, the shapes of the alignment reference marks 10a and 10b are made different at the left and the right, and discrimination of the ear side and the nose side can be facilitated. Consequently, load on production is reduced, efficiency in production and management is enhanced, and cost reduction can be realized.

The embodiment of the present invention is explained thus far, but the present invention is not limited to this. For example, the surface which becomes the reference of the definition of the progressive zone length, and the surface which becomes the reference of the definition of the inner shift amount for near vision generally correspond to each other, and therefore the surface which becomes the reference of the definition of the progressive zone length and the inner shift amount for near vision can be specified in one reference surface specifying information (the definition method specifying information 11e). However, the surface which becomes the reference of the definition of the progressive zone length and the surface which becomes the reference of the definition of the inner shift amount for near vision may be independently specified by separate pieces of the reference surface specifying information.

A mode in which both of the progressive zone length specifying information and the inner shift amount for near vision specifying information are omitted can be also considered. In this case, the definition method specifying information 11e does not have to carry the function as the reference surface specifying information, and therefore the information amount of the definition code table (refer to Table 5) can be reduced to a half. In this case, in place of the definition code table shown in the above described Table 5, for example, the definition code table shown in the following Table 6 can be used.

TABLE 6

| CODE | MEASURING METHOD |
| --- | --- |
| F | CONVEX SURFACE ADDITION DIOPTER |
| B | CONCAVE SURFACE ADDITION DIOPTER |
| W | WEAR ADDITION DIOPTER |

When this definition code table in Table 6 is used, the definition method specifying information plays only the role of the addition diopter definition specifying information that specifies whether the addition diopter of the lens 9 is defined in accordance with the convex surface addition diopter, the concave surface addition diopter, or the wear addition diopter. In concrete, when "27W" is inscribed on the nose side, the definition method of the addition diopter can be identified to be the wear addition diopter from "W", by referring to the above-described Table 6.

As the optical performance values of the progressive-power lens, there are the progressive zone length, the inner shift amount for near vision, the material refractive index, the addition diopter and the like, and information indicating the optical performance values other than these may be inscribed, or some of them may be suitably selected and inscribed. The information specifying the grade, type and the like of the commodity product may be inscribed on the lens surface.

As the inscribing method, there is the method which makes an inscription on the mold for the lens molding, and transfers the inscription onto the lens. Timing of making an inscription is not specially limited, and processing may be performed with $CO_2$ laser from above a film after lens surface machining and surface treatment of the antireflection film are finished. After convex surface grinding, marking may be performed in the state in which the lens under machining is blocked. $CO_2$ laser is used for the inscription, but the mark can be also inscribed by marking with a diamond pen or the like.

The code tables shown in the above-described Tables 1 to 6 may be made electronic data, which may be delivered to an optician, an ophthalmologist and the like via a network communication line.

According to the present invention, the progressive-power lenses can be properly evaluated based on the optical performance values such as the progressive zone length and the inner shift amount for near vision.

What is claimed is:

1. A progressive-power lens,
   wherein optical performance specifying information which specifies optical performance values of the progressive-power lens, and definition method specifying information which specifies definition methods of the optical performance values are attached.

2. The progressive-power lens according to claim 1,
   wherein as the definition method specifying information, reference surface specifying information that specifies which one of a convex surface and a concave surface is used as a reference when the optical performance value is defined is attached.

3. The progressive-power lens according to claim 1,
   wherein as the optical performance specifying information, addition diopter specifying information, which specifies a value of addition diopter of the progressive-power lens, is attached; and
   wherein as the definition method specifying information, addition diopter definition method specifying information that specifies at least which one of a convex surface and a concave surface of this progressive-power lens is used as a reference when the addition diopter is defined, or the addition diopter is calculated based on a sight line position and a center of rotation of an eye when wearing this progressive-power lens, is attached.

4. The progressive-power lens according to claim 1,
   wherein two alignment reference marks for framing are attached on a horizontal reference line passing through a design center of the progressive-power lens symmetrically about the design center;
   wherein these alignment reference marks are disposed at positions at which they remain on a lens surface after the lens is set into a frame; and
   wherein the optical performance specifying information and the definition method specifying information are attached in the vicinity of the alignment reference marks.

5. The progressive-power lens according to claim 1,
   wherein the optical performance specifying information and the definition method specifying information are symbolized and attached; and
   wherein meaning of the symbols can be identified with reference to code tables previously made.

6. The progressive-power lens according to claim 2,
   wherein as the optical performance specifying information, addition diopter specifying information, which specifies a value of addition diopter of the progressive-power lens, is attached; and
   wherein as the definition method specifying information, addition diopter definition method specifying information that specifies at least which one of a convex surface and a concave surface of this progressive-power lens is used as a reference when the addition diopter is defined, or the addition diopter is calculated based on a sight line position and a center of rotation of an eye when wearing this progressive-power lens, is attached.

7. The progressive-power lens according to claim 2,
   wherein two alignment reference marks for framing are attached on a horizontal reference line passing through a design center of the progressive-power lens symmetrically about the design center;
   wherein these alignment reference marks are disposed at positions at which they remain on lens surface after the lens is set into a frame; and
   wherein the optical performance specifying information and the definition method specifying information are attached in the vicinity of the alignment reference marks.

8. The progressive-power lens according to claim 3,
   wherein two alignment reference marks for framing are attached on a horizontal reference line passing through a design center of the progressive-power lens symmetrically about the design center;
   wherein these alignment reference marks are disposed at positions at which they remain on lens surface after the lens is set into a frame; and
   wherein the optical performance specifying information and the definition method specifying information are attached in the vicinity of the alignment reference marks.

9. The progressive-power lens according to claim 2,
   wherein the optical performance specifying information and the definition method specifying information are symbolized and attached; and wherein meaning of the symbols can be identified with reference to code tables previously made.

10. The progressive-power lens according to claim 3, wherein the optical performance specifying information and the definition method specifying information are symbolized and attached; and wherein meaning of the symbols can be identified with reference to code tables previously made.

11. The progressive-power lens according to claim 4, wherein the optical performance specifying information and the definition method specifying information are symbolized and attached; and wherein meaning of the symbols can be identified with reference to code tables previously made.

* * * * *